United States Patent [19]

Levy et al.

[11] Patent Number: 4,797,763
[45] Date of Patent: Jan. 10, 1989

[54] COMPACT MAGNETIC HEAD FLEXIBLE SUSPENSION

[75] Inventors: Lloyd Levy, Chatsworth; Michael W. Warner, Westlake; Dan L. Kilmer, Reseda, all of Calif.

[73] Assignee: Micropolis Corporation, Chatsworth, Calif.

[21] Appl. No.: 896,383

[22] Filed: Aug. 13, 1986

[51] Int. Cl.$^4$ .................... G11B 5/48; G11B 21/16
[52] U.S. Cl. ................................... 360/104; 360/103
[58] Field of Search ............... 360/103, 105, 106, 104, 360/99

[56] References Cited

U.S. PATENT DOCUMENTS

| | | | |
|---|---|---|---|
| 4,167,765 | 9/1979 | Watrous | 360/103 |
| 4,402,025 | 8/1983 | Anderson et al. | 360/103 X |
| 4,611,257 | 9/1986 | Shisoyama et al. | 360/104 |

FOREIGN PATENT DOCUMENTS 0117367  9/1981  Japan .................. 360/104

Primary Examiner—John H. Wolff
Assistant Examiner—David J. Severin
Attorney, Agent, or Firm—Poms, Smith, Lande & Rose

[57] ABSTRACT

A digital memory system of the hard or Winchester disk type, includes a series of hard disks, and pivoted mounting arms for the magnetic heads or sliders. In order to minimize the vertical, or inter-disk space occupied by the sliders and their mounting arms when used in a rotary type of head positioner, the end of a direct, or straight, mounting arm for each slider is generally ring-shaped, or of an open rectangular configuration, with the outer transverse portion of the mounting arm extending through a slot in the surface of the slider which is not intended for engagement with or proximity to the recording disk. In addition, the slider is secured to the mounting arm by a small springy resilient sheet metal member, having a broad central area with a rounded protrusion intended to engage the outer transverse portion of the ring-shaped end of the mounting arm, and being bonded to the slide at the bottom of the slot in the slider on either side of the rounded bearing member. This small springy member has two arms extending from it which are secured to the slider mount, at the outer ends of the arms away from the broader central area of the springy member, so that the slider is free to pivot through a small angle relative to its mounting arm, thereby allowing stable operation of the air bearing action to support the slider in a predefined position and attitude relative to the disk surface. The slider mounting arm has an outer load beam section with up-turned edges to increase its stiffness or rigidity, and a transverse plate is secured to these upturned edges to increase the natural frequency of the slider mounting arm. The load beam has the additional function of establishing force equilibrium with the air bearing action to provide control of flying height above the disk surface.

18 Claims, 3 Drawing Sheets

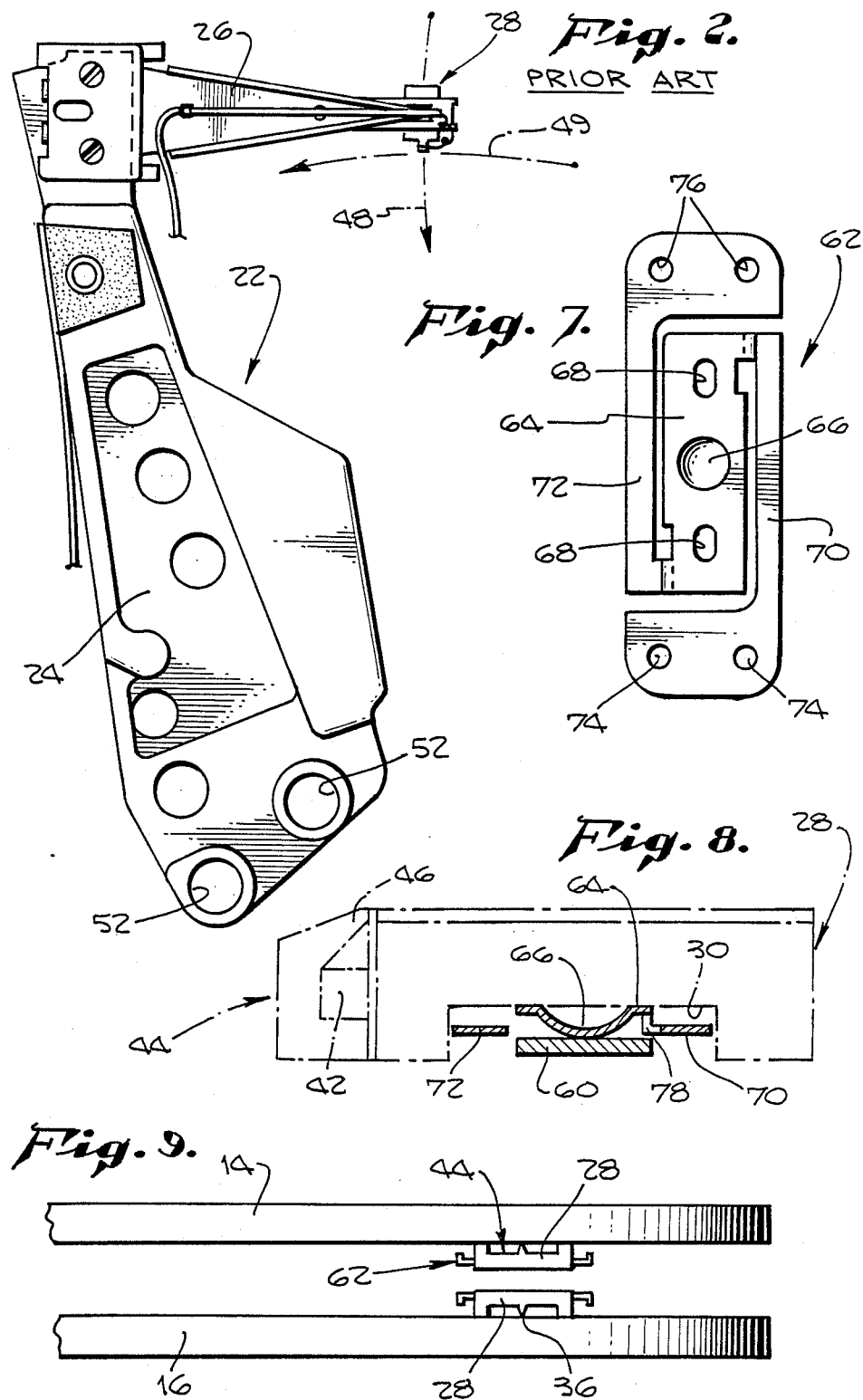

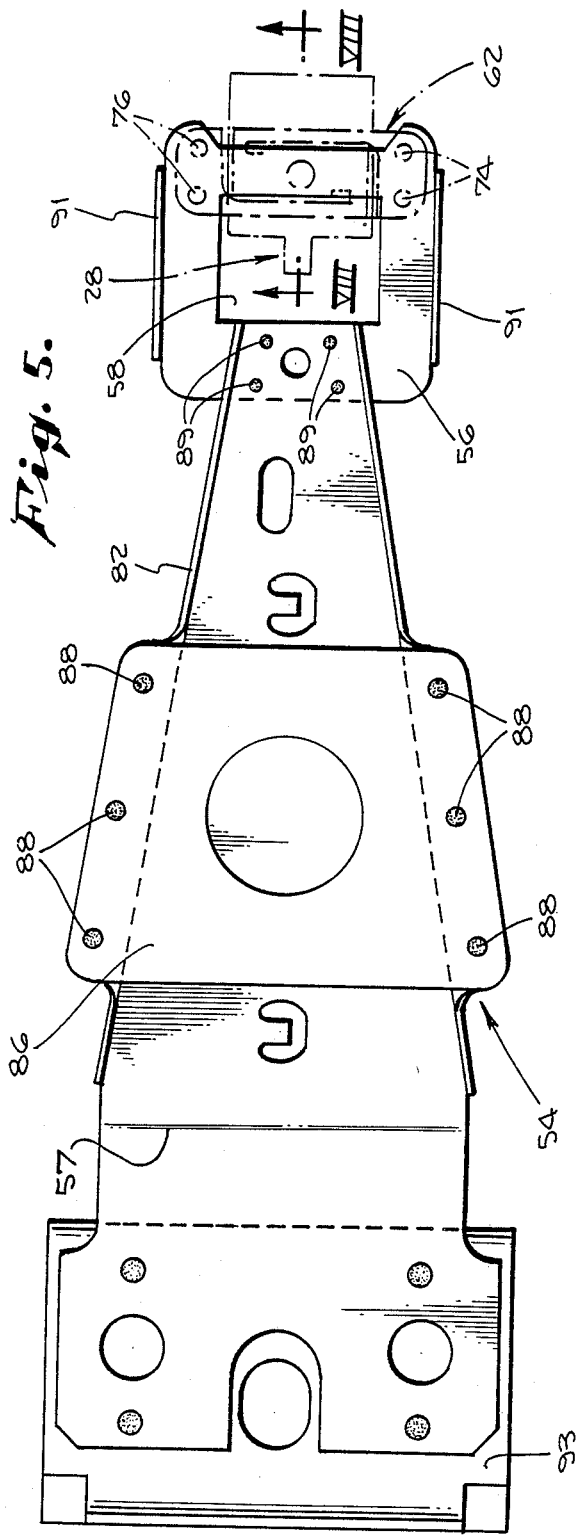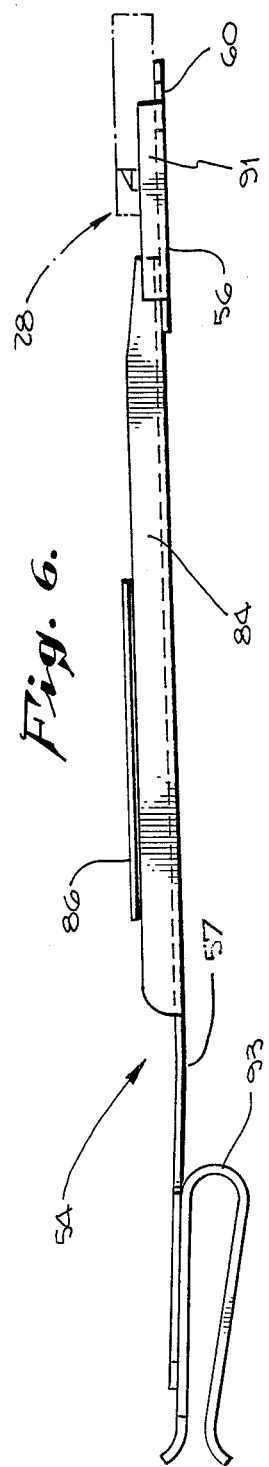

COMPACT MAGNETIC HEAD FLEXIBLE SUSPENSION

FIELD OF THE INVENTION

This invention relates to hard magnetic disk memory head or slider suspension systems.

BACKGROUND OF THE INVENTION

Digital data may be stored on flexible or "floppy" disks or on hard or Winchester-type disks by the magnetization of successive small areas on the magnetic surface of the disk by a magnetic head or slider as the disk rotates. The density of digital storage on hard disk memory systems is in the order of ten or twenty times the density achieved with floppy disk memory systems. Concerning the use of the terms "magnetic head" or "slider", the terms are used herein somewhat interchangeably, but with "slider" being used primarily to designate the monolithic or composite member per se, and the term "magnetic head" or "magnetic head assembly" referring to the slider and some portion of its associated suspension.

In the field of Winchester-type disks, the early systems involved a linear movement of the heads or sliders radially to the center of the disks; and certain standard magnetic heads or sliders and their suspensions were developed with a mounting slot on the side of the slider away from active side of the slider which faces the rotating disk; and the longitudinal axis of the slider was oriented perpendicular to the longitudinal axis of the suspension in order to maximize performance in a linear head positioner. Incidentally, because of the high speed of rotation of the rigid disks, the heads or sliders usually "fly" a few millionths of an inch above the surface of the disk. The mounting slot was transverse to the longitudinal axis of the slider and extended radially with respect to the disks for sliders of the low cost "monolithic" type of "composite" type.

Rigid or Winchester-type magnetic storage disks were originally relatively large in diameter, but in the last few years the size has been reduced, so that five and one-quarter inch disk systems are now widely available. As disk drives shrank in size, rotary had positioners became attractive from a cost and space viewpoint.

In order to adapt the reliable available heads or sliders for use with 5¼ inch disk rotary positioner systems, it was simple to mount the linear slider suspensions perpendicular to and on the end of a pivotal arm, to form a "right angle" configuration, with the slider and its adjacent "load beam" mounting member moving substantially as before along a shallow arc across the disk rather than with a purely linear motion along a radial line. The longitudinal axis of the slider was also at right angles to the adjacent "load beam" mounting member. While this right-angle or "dog-leg" arrangement simplified the original design effort for rotary head positioner systems, the weight and inertia of the right angle style mounting arms were excessive, in view of the need to shift the head rapidly across the surface of the disk to access new information.

In order to reduce the weight and the moment of inertia of the head mounting arms, straight pivoted arms were then developed with the support arm, or suspension, aligned with and overlying the slider. However, with conventional monolithic sliders, this forms a relatively thick assembly so that the spacing of the disks in multiple disk units is greater than would be desirable (due to fact that each disk surface usually has a head-suspension assembly interfacing to it), and the resultant digital storage density is not as high as would be desirable due to a reduction in the total number of disks.

Accordingly, principal objects of the present invention are to reduce the inter-disk spacing, and increase the total storage of multiple hard disk storage systems, using a slider suspension having a relatively low moment of inertia, so that the heads may be moved across the disk at high speeds and with a relatively lightweight, low-power, actuator.

SUMMARY OF THE INVENTION

In accordance with the present invention, the foregoing objects are achieved through the use of a substantially ring or open rectangular shaped local mounting arrangement for the monolithic magnetic slider or head, with the outer portion of the ring mount forming a crossbar extending through the transverse mounting slot of the slider, and with a portion of the head extending into the hole in the open rectangular ring type mount.

Additional features of the invention may include any of the following features:

1. A resilient support for coupling the slider to the outer transverse portion of the ring or open rectangular mount to permit limited angular movement of the slider.

2. An implementation of the resilient support in which a small springy sheet metal member is provided which has a relatively broad central area bonded to the slider and having a formed rounded bearing surface for pivotally engaging the transverse portion of the mount, and two arms extending from said central area and having their outer ends bonded to the ring shaped mount. This permits limited gimbal type movement of the slider with respect to the end of the mounting arm, so that the slider may smoothly "fly" over the surface of the hard disk in full alignment with the disk surface.

3. The use of reinforcing ribs formed of the edges of the head or slider sheet metal load beam portion of the mounting arm bent perpendicular to the surface of the mounting arm to occupy substantially the same vertical or inter-disk extent as the head or slider.

4. The use of a stiffening reinforcing plate extending across between the turned-up edges of the sheet metal mounting arm.

5. The inclusion of a preformed section of the load beam to provide counter-balancing force necessary to maintain correct air bearing operation. This section provides low stiffness in the disk axis direction to maintain as constant a force as possible over a range of tolerances, while maintaining an overall high resonant frequency.

It may also be noted that the crossbar at the outer end of the mounting arm for supporting the slider need not be in a precise ring-shaped or open rectangular, symmetrical configuration, as long as it is firmly supported against vibration and has an associated recess toward the pivot point of the mounting arm for receiving a portion of the head or slider.

Other objects, features and advantages of the invention will become apparent from a consideration of the following detailed description and from the accompanying drawings.

BRIEF DESCRIPTION OF THE DRAWINGS

FIG. 2 is a showing of a prior art right angle type mounting arm for magnetic sliders or heads, for hard disk type memory systems;

FIG. 5 is a top view of a mounting arm for a magnetic slider and suspension assembly, illustrating the principles of the present invention;

FIG. 6 is a side view of the mounting arm of FIG. 5;

FIG. 7 is a detailed showing of a small resilient springy element which mounts the head from the ring or open rectangular shaped end of the mounting arm;

FIG. 8 is a cross-sectional view taken along lines VIII—VIII of FIG. 5; and

FIG. 9 is a digrammatic side view of a pair of adjacent hard magnetic storage disks, and two magnetic sliders overlying one another and located between the two storage disks.

DETAILED DESCRIPTION

Figure 1:
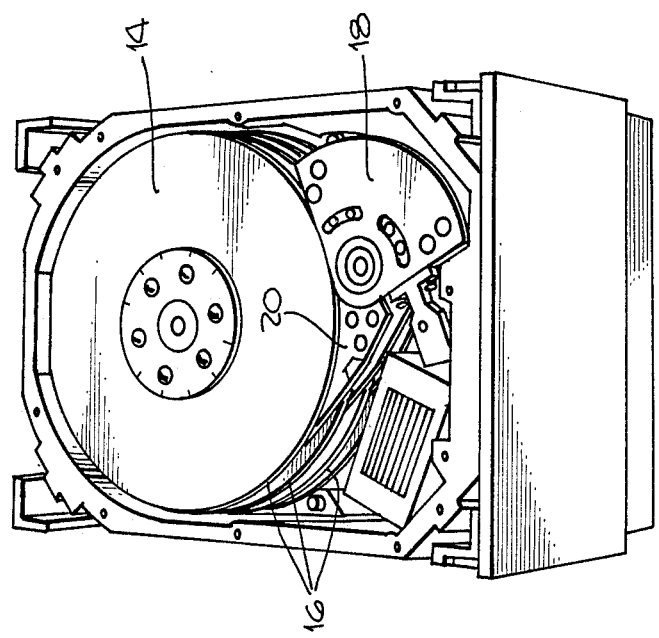
FIG. 1 is an overall view of a typical hard or Winchester-type disk drive memory system which employs a rotary positioner using typical right angle type head suspension assemblies.

Referring more particularly to the drawings, FIG. 1 shows a typical digital memory system of the hard magnetic disk or the so-called Winchester type. The unit of FIG. 1 is shown with the cover removed so that the upper hard magnetic memory disk 14 is clearly visible, and the edges of additional disks 16 are visible toward the left inside of the housing. The assembly 18 is the actuator for moving the magnetic heads or sliders, across the surface of the hard magnetic disks 14, 16. One of the head supporting arms 20 is visible, extending between the top disk and the next lower disk, and additional arms for supporting magnetic sliders or heads are visible immediately below the mounting arm 20. In practice, each mounting arm normally carries two aligned heads, one for engaing the disk which is on one side of the mounting arm and the other for engaging the adjacent surface of the next disk which is below the mounting arm. All of the mounting arms and the associated heads are normally shifted in unison, under the control of an electromagnetic actuator 18.

Magnetic disk systems of the type shown in FIG. 1 are made by the assignee of the present invention, Micropolis Corporation, having its principal place of business at 21123 Nordhoff Street, Chatsworth, Calif. 91311. Two of the 5¼ Winchester disk drives made by Micropolis Corporation are identified as the 1320 Series and the 1350 Series.

Figure 3:
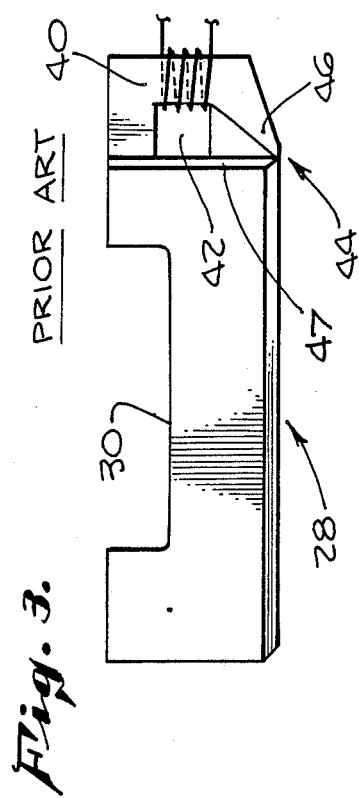
FIG. 3 is a side view of a low cost monolithic magnetic slider of a standard type made for use with Winchester or hard disk memory systems.
Figure 4:
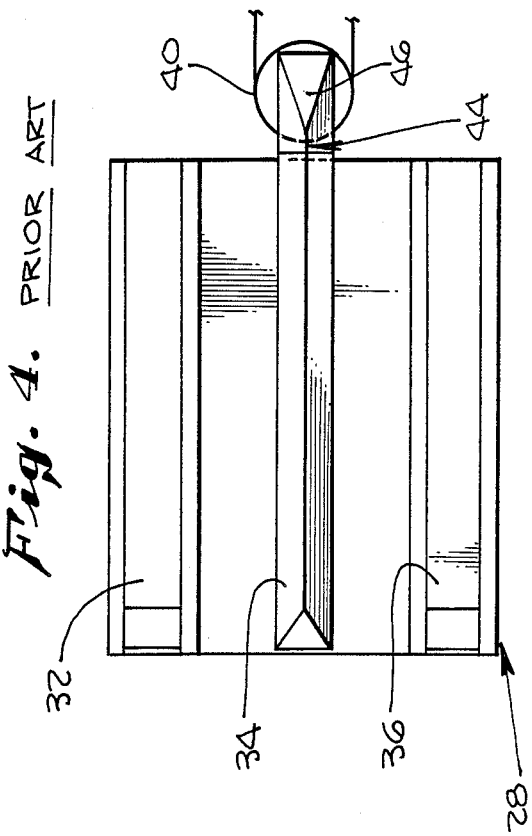
FIG. 4 is a view of the face of the slider unit which is intended to engage or to be closely spaced with respect to the hard magnetic disk with which it interacts.

FIG. 2 shows a prior art right angle type mounting arm 22, including a rigid portion 24, and a flexure portion 26 for mounting magnetic sliders 28 having the configuration substantially as shown in FIGS. 3 and 4 of the drawings.

Referring to FIGS. 3 and 4 of the drawings, the monolithic slider 28 includes a mounting slot 30 on one side, and two ridges 32, and 36 which are on opposite sides of the slider and form a self-actuating air bearing, allowing the head to "fly" closely adjacent the surface of the magnetic disk with which it interacts. A coil 40 is wound through a small opening 42 at one end of the slider structure, and coupling is made with the hard disk at the very small area or point 44 where the magnetic core arm 46 closely approaches the central narrow ridge 34 of the slider assembly. The spacer 47 is of nonmagnetic material. Digital information is recorded in the form of magnetized areas or points on the hard disk which are adjacent to the gap 44; and previously recorded information may be picked up by the coil 40, in accordance with the magnetization of the particular zone of the disk which is immediately adjacent the gap 44 as the slider moves over the disk. All of this is of course, well known in the digital data storage field.

Now, returning to FIG. 2, the right angle configuration is convenient for use with the small 5¼ inch Winchester storage disks, because the resilient mounting arm 26 may extend through the slot 30 of slider 28, and properly locate the coil 40 so that the relative movement of the disk and the slider is an indicated by the arrows 48 in FIG. 2. It may also be noted that the arrow 49 indicates the direction of movement of the slider 28 in shifting position toward or away from the center of the disk to access different digital information, or to record on a different track.

However, as mentioned hereinabove, when an attempt was made to mount the sliders 28 directly from a pivot point located in the vicinity of the mounting holes 52 as shown in FIG. 2, the mounting slot 30 was not easily used, and accordingly, with the flexure assembly corresponding to the member 26 in FIG. 2 being secured across the upper surface of the slider 28 on the other side of the slider from the gap 44, as shown in FIG. 3, the result was a relatively thick head and mounting arm assembly, so that close spacing of adjacent hard disks was not practical. Now, the mounting arrangement of the present invention, which has obviated this problem, will be discussed in connection with FIGS. 5 through 8 of the drawings.

Referring to FIG. 5 of the drawings, the mounting arm 54 is made of sheet metal and has a preformed or slightly bent zone 57, which provides the desired constant slider-to-disk pressure for proper air bearing operation, while maintaining the resonant frequency of the mounting arm at a sufficiently high frequency to avoid undesired vibrations. The arm 54 has an outer end 56 for holding the slider of the type shown at 28 in FIGS. 3 and 4, and with a central opening 58 so that the mounting end is substantially "ring-shaped," or has an open rectangular configuration. Further, the outer transverse portion 60 of the arm 54 passes through the mounting slot 30 of the slider, as shown for example, in FIG. 3 of the drawings.

It is desirable that the slider 28 be free to pivot to a small extent relative to the mounting arm 54 and its outer end 56, as it "flies" over the rapidly rotating hard disk to prevent variations in the mounting clip (93) position from disturbing the slider flying attitude. In order to provide this capability, a thin springy sheet metal member 62 is provided. This sheet metal member is shown overlying the transverse end portion 60 of the mounting arm 54, in FIG. 5 of the drawings, but it shown separately in FIG. 7 so that its configuration may be more easily appreciated. As best shown in FIG. 7, the springy element 62 has a broader central area 64 provided with a formed rounded protrusion or bump 66 which extends back toward and engages the cross bar 60 at the end of the ring-shaped portion 56 of the mounting arm 54. This engagement of the rounded protrusion 66 with the member 60 is shown to advantage in FIG. 8 of the drawings. On the broader area 64 of the element 62, on either side of the rounded portion 66, the element 62 is secured to the slider 28 by an adhesive material, such as epoxy. This is indicated by the areas 68, in FIG. 7 of the drawings. The thin flexible arms 70 and 72 extend from the broader central area 64 in both directions. Arm 70 is secured to the mounting portion 56 at weld points 74, while the arm 72 is secured to member 56 at the weld points 76.

It may be noted from FIG. 8 that the arms 70 and 72 are offset from the plane of the broader area 64, by bends, as indicated at point 78 in FIG. 8. Accordingly, the slider 28 is free to pivot slightly from the orientation of the mounting arm 54 and its outer end 56, by pivoting about the rounded engagement between members 66 and 60, as shown in FIG. 8. Incidentally, to indicate the relatively small dimensions which are involved in the present assembly, the springy member 62 is made of stainless steel sheet metal stock which is approximately 0.002 inch in thickness, while the stainless steel sheet metal member 54 is approximately 0.003 inch in thickness.

In order to provide incresed rigidity for the outer load beam portion of the flexure arm 54, its edges 82 and 84 are turned upwardly, or away from the main plane of the sheet metal mounting arm 54. Further, to increase torsional stiffness and increase the natural frequencies of vibration of the mounting arm, an additional plate 86 may be provided, and this may be secured to the additionally out-turned edges 82 and 84, at the weld points designated 88, in FIG. 5. It may also be noted that the ring-shaped outer member 56 is also formed of sheet metal, and is secured to the main portion of the arm 54 at weld points 89. Also, the outer member 56 is provided with upturned edges 91 which longitudinally overlap the upturned edges 82, 84.

FIG. 9 is a diagrammatic showing of two hard magnetic disks 14 and 16, with two magnetic sliders both designated 28, mounted therebetween. It may be noted that the thickness of the hard disks has classically been approximately 0.075 inch, or 75 thousandths of an inch. It is customary to have two heads mounted to move together, with one head mounted directly over another, so that the space between the two disks must be sufficient to accommodate the two heads and the mounting arm arrangements for these two heads. Using the old right angle type arrangements, the absolute minimum between disks was approximately 0.200 inch, or two tenths of an inch. Using the prior pivoted "straight" mounting arms, with the mounting arm overlying the entire slider head, the minimum distance between disks was approximately 0.25 inch, or one-quarter of an inch. However, this arrangement permitted a considerable reduction in the moment of inertia of the mounting arm, and was thus frequently preferred over the dog-leg arrangement because of the reduced mass and moment of inertia and the consequent lower power requirements for rapid movement of the heads. Using the new arrangement having the ring-shaped ends for the mounting arms, the inter-disk space required for two heads is reduced to approximately 0.160 inch or one hundred and sixty thousandths of an inch. Accordingly, the disks may be spaced considerably closer together than has been practical heretofore, with a consequent significant space saving which could be utilized to add additional disks. In addition, with the low inertia of the "straight" mounting arms, high speed movement of the heads may be accomplished with relatively low power requirements.

Incidentally, and for completeness, it may be noted that the suspension assembly shown in FIGS. 5 and 6 is approximately 1⅛ inches long and 0.4 inch wide. The load beam is formed of stainless steel having a thickness of 0.003 inch for the main portion thereof, and 0.005 inch for the outer doughnut-shaped member. The load beam 54 is welded to clip 93, which is secured to the rotatable portion of actuator 18 (see FIG. 1).

Concerning the magnetic head suspension member 62 as shown in FIG. 7, it has significantly improved resistance to shock damage and distortion as compared with prior art arrangements in which a flexible member supported at only one end, was employed. In the prior art arrangements, a shock or impact from one end could buckle the support arms; while the symmetrical double ended support arrangements for part 62 provides significantly increased shock resistance.

In conclusion, it is to be understood that the foregoing detailed description and the accompanying drawings are merely illustrative of one preferred embodiment of the invention. Various changes and modifications may be employed without departing from the spirit and scope of the invention. Thus, by way of example and not of limitation, other types of magnetic heads or sliders having slightly different configurations may be employed, the stiffening and damping effect of the additional plate 86 may be accomplished by the use of a plastic or a elastomeric-type coating applied to the mounting arm, and alternative type pivoting arrangements for the slider relative to the outer crossbar of the mounting arm may be provided. Accordingly, it is to be understood that the present invention is not limited to the arrangements precisely as shown and described hereinabove.

We claim:

1. A hard disk memory head mounting assembly having low inertia and reduced inter-disk spacing, comprising:

an extended load beam mounting arm having a substantially ring-shaped outer end including a transverse head supporting portion at its outermost end;

a standard hard disk type magnetic head having a first disk bearing and coupling side having a pair of longitudinally extending grooves, and a second mounting side having a transverse mounting slot therethrough;

means for mounting said magnetic head to said transverse head supporting portion, with said portion extending through the mounting slot, and said head having one portion extending up into the opening in the ring-shaped outer end of said mounting arm; and said mounting means being a springy sheet metal member having a central broad area with a rounded bearing means extending from said broad central area for pivotally engaging substantially the center of said transverse head supporting portion at an engagement point at the end of said rounded bearing means, said central broad area being secured to said magnetic heat at the bottom of said mounting slot, and said sheet metal member having two arms extending from said central broad area in opposite directions along said supporting portion and bonded to said supporting portion at the ends of each said arm;

whereby the magnetic head is pivotally and resiliently mounted to said mounting arm to pivot through small angles about the engagement point at the end of said rounded bearing means.

2. An assembly as defined in claim 1 wherein said outer end is a separate sheet metal member bonded to the main portion of said mounting arm at the outer end thereof.

3. An assembly as defined in claim 1 wherein said mounting arm is formed of a tapered enlongated sheet metal member having a principal set of up-turned outer edges to increase the stiffness thereof.

4. An assembly as defined in claim 3 including stiffening and damping means for further reducing the flexibility of said arm.

5. An assembly as defined in claim 4 wherein said damping means includes an additional sheet metal element extending across between said up-turned edges and being bonded thereto.

6. An assembly as defined in claim 3 wherein said outer end of the mounting arm is also formed of sheet metal and has a second set of up-turned outer edges.

7. An assembly as defined in claim 6 wherein said second set of upturned outer edges overlap said principal set of upturned edges of said mounting arm.

8. A hard disk memory system including a head mounting assembly which has a low inertia and close inter-disk spacing, said assembly comprising:
   an extended load beam mounting arm having a pivotally mounted inner end and a transversely extending head supporting portion at its outermost end, and having an opening or recess in the mounting arm toward the inner end thereof immediately adjacent said portion;
   a standard hard disk type magnetic head having a first disk bearing and coupling side having a pair of longitudinally extending groves, and a second mounting side having a transverse mounting slot therethrough;
   means for mounting said magnetic head to said transverse head supporting portion, with the head supporting portion extending through the mounting slot, and said head having one portion extending up into said adjacent opening or recess of said supporting arm; and
   said mounting means being a springy sheet metal member having a central broad area with a rounded bearing means extending from said broad central area for pivotally engaging substantially the center of said transverse head supporting portion, at an engagement area at the end of said rounded bearing means, said central broad area being secured to said magnetic head at the bottom of said mounting slot, and said sheet metal member having two arms extending from said central broad area in opposite directions along said supporting portion and bonded to said tranverse head supporting portion at the ends of each said arm;
   whereby the magnetic head is pivotally and resiliently mounted to said mounting arm to pivot through small angles about the engagement area at the end of said rounded bearing means.

9. An assembly as defined in claim 8 wherein said head supporting portion is formed of sheet metal.

10. As system as defined in claim 8 further including at least two hard magnetic disks, means for mounting said disks for rotation in close proximity to one-another, and means for moving said mounting arm to shift said magnetic head substantially radially over the surface of at least one of said magnetic disks between said two disks.

11. An assembly as defined in claim 8 wherein said mounting arm is formed of a tapered elongated sheet metal member having up-turned outer edges to increase the stiffness thereof.

12. An assembly as defined in claim 11 including stiffening or damping means for further reducing the flexibility of said arm.

13. An assembly as defined in claim 12 wherein said stiffening or damping means includes an additional sheet metal element extending across between said up-turned edges and being bonded thereto.

14. A hard disk memory system including a head mounting assembly which has a low inertia and close inter-disk spacing dimensions, said assembly comprising:
   an extended load beam mounting arm having a substantially ring-shaped outer end including a transverse head supporting portion at its outermost end;
   a standard hard disk type magnetic head having a first disk bearing and sensing side having a pair of longitudinally extending grooves, and a second mounting side having a transverse mounting slot therethrough;
   means for resiliently mounting said magnetic head to said transverse head supporting portion, with said portion extending through the mounting slot, and said head having one portion extending up into the opening in the ring-shaped outer end of said supporting arm; and
   said resilient mounting means being a springy sheet metal member having a central broad area with a rounded bearing means extending from said broad central area for pivotally engaging substantially the center of said transverse head supporting portion at an engagement area at the end of said rounded bearing means, said central broad area being secured to said head at the bottom of said mounting slot, and said sheet metal member having two arms extending from said central broad area in opposite directions along said supporting portion and bonded to said support portion at the ends of each said arm;
   whereby the magnetic head is pivotally and resiliently mounted to said mounting arm to pivot through small angles about the engagement area at the end of said rounded means.

15. A system as defined in claim 14 further including at least two hard magnetic disks, means for mounting said disks for rotation in close proximity to one-another, and means for moving said mounting arm to shift said magnetic slider substantially radially with respect to said disks, over the surface of at least one of said magnetic disks and between said two disks.

16. An assembly as defined in claim 14 wherein said mounting arm is formed of a tapered elongated sheet metal member having up-turned outer edges to increase the stiffness thereof.

17. An assembly as defined in claim 16 including stiffening or damping means for further reducing the flexibility of said arm.

18. An assembly as defined in claim 16 wherein said ring-shaped outer end of the mounting arm is also formed of sheet metal and also has up-turned outer edges.

* * * * *